J. G. WIGGINS.
Attaching Spokes to Wheels.
No. 112,200.
Patented Feb 28, 1871.
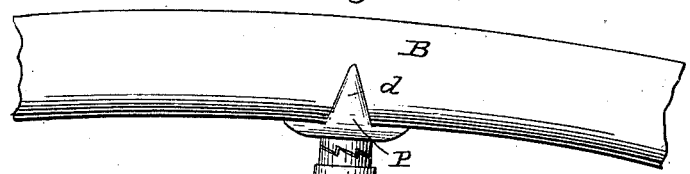
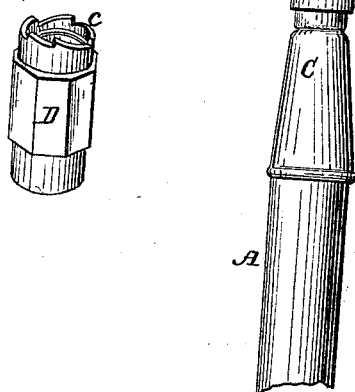
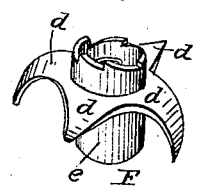
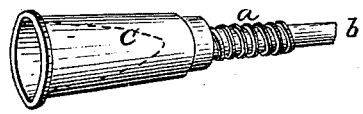
Witnesses:
Inventor:

UNITED STATES PATENT OFFICE.

JEFFERSON G. WIGGINS, OF LIMA, NEW YORK, ASSIGNOR TO HIMSELF AND J. S. GALLETINE, OF SAME PLACE.

IMPROVEMENT IN THE MODES OF ATTACHING SPOKES TO WHEELS.

Specification forming part of Letters Patent No. 112,200, dated February 28, 1871.

*To whom it may concern:*

Be it known that I, JEFFERSON G. WIGGINS, of Lima, in the county of Livingston and State of New York, have invented a new and useful Improvement in Wagon-Wheels; and I do declare that the following is a true and accurate description thereof, reference being had to the accompanying drawing, and to the letters of reference marked thereon, and being a part of this specification, in which—

Figure 1 is a section of a wheel provided with my improvement. Fig. 2 is a representation of the spoke-socket. Fig. 3 is a representation of the ratcheted nut. Fig. 4 is a view of the felly-plate.

Like letters indicate like parts in each figure.

The nature of this invention relates to an improvement in connecting the outer ends of the spokes with the fellies; and consists in a device composed of a spoke-socket, nut, and felly-plate, in connection with a spoke and felly, as and for the purposes hereinafter more fully set forth.

In the accompanying drawing, A represents a spoke, and B a felly, connected together in the following manner, and by the devices which I will now to describe.

C is a socket to receive the end of the spoke, and it terminates in a solid stem provided with a thread, $a$, and the stem terminates in a flattened or oval stem, $b$. D is a nut, which is designed to engage with the thread $a$ on the stem. One end of this nut is ratcheted or provided with teeth, as at $c$.

F is a felly-plate and socket, the hole through it being oval, to conform to the shape and size of the termination $b$ of the stem. This plate is provided with stelliform flanges $d$, or other shape, if preferred, as shown, that portion of the plate below the flange $d$ being a stud, $e$, while the projection above the flange is ratcheted to engage with the teeth $c$ of the nut.

The spoke A is inserted in the socket C. The stud $e$ of the felly-plate F is let into the inner face of the felly B, a hole having been partially bored through the felly to receive the stud, and the flange $d$ bent to conform to the said inner face of the felly. The nut being screwed onto the thread $a$ of the stem, the oval termination of the latter is inserted into the hole through the felly-plate, and the nut should then be screwed down until its ratcheted face engages with the corresponding face of the felly-plate.

The advantages I claim for this device may be thus enumerated: First, it makes a more durable connection of the felly with the spoke, thereby preventing a wheel from becoming "felly bound;" second, as no hole is bored through the felly to receive the end of the spoke, a lighter felly may be used, which will be stronger than a heavier felly would be when the spoke is driven as in the ordinary method; third, it secures a very practical method of truing the wheel on the box when the same is driven straight through the hub; fourth, it makes a cheap, convenient, and valuable way of setting tire, in that the felly is not injured by taking off the tire, no new holes are required to be bored for bolts or screws, and no extra expense incurred, as every one can set his own tire when necessary.

The turning of the nut on each spoke one notch of the ratchet will at any time set a tire, and, by screwing each nut off as far as the shoulder will admit, will materially enlarge the circumference of the wheel.

The socket, nut, and felly-plate may be made of any suitable metal, either cast or wrought.

The stem $b$ and its corresponding hole through the felly-plate should be oval, as shown and described, in order to prevent the socket from turning on the spoke.

What I claim as my invention, and desire to secure by Letters Patent, is—

The arrangement of the socket C, nut D, and felly-plate F, when each part is constructed substantially as described, with the spoke A and felly B, for the purposes set forth.

JEFFERSON G. WIGGINS.

Witnesses:
HENRY DECKER,
T. C. MORGAN.